3,323,309
UNDERGROUND STORAGE FOR WATER AND METHOD OF CONSTRUCTING THE SAME
Curzon Dobell, P.O. Box 643, Nassau, Bahamas
Filed Aug. 31, 1964, Ser. No. 393,101
Claims priority, application Great Britain, Sept. 18, 1963, 36,756/63
10 Claims. (Cl. 61—1)

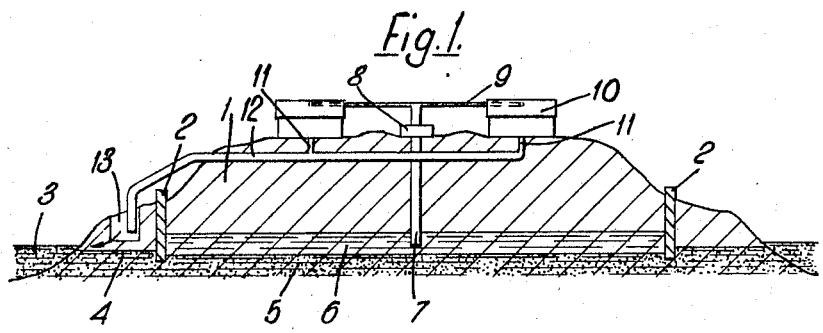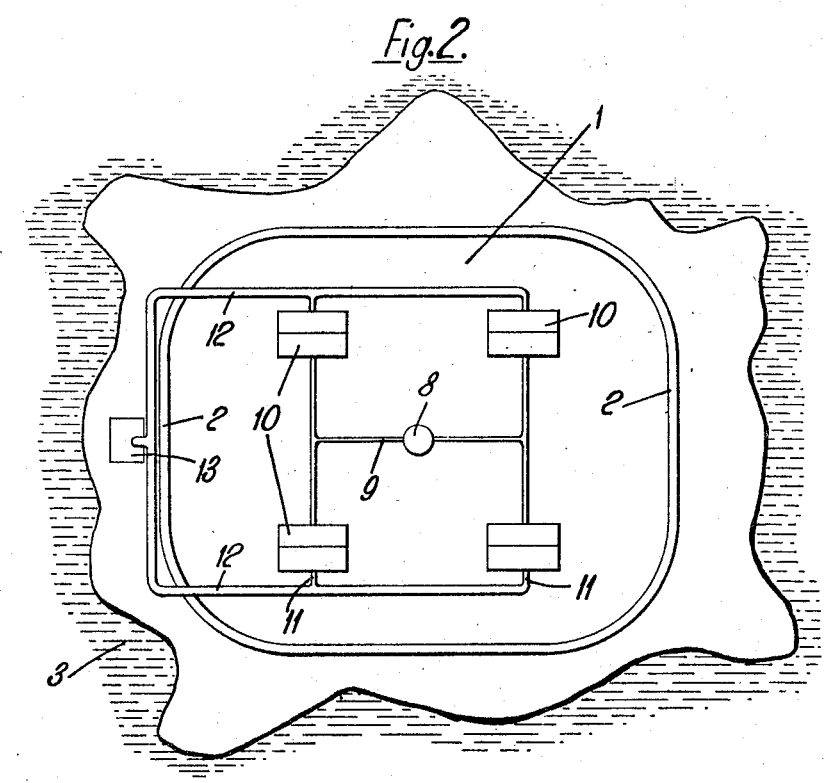

ABSTRACT OF THE DISCLOSURE

A sub-surface water reservoir and a method of constructing it, the reservoir comprising a substantially water impervious, substantially vertical continuous barrier extending beneath the surface of an area of porous ground beneath which is a saline ground-water table and in which surface water drains into the ground in sufficient quantity. The barrier surrounds an area of this porous ground and a subsurface volume thereof, and the lower edge of the barrier extends below the normal lowest level of the saline ground-water table. The lateral flow of water out of the surrounded volume of the porous ground is thereby substantially prevented.

---

This invention is for improvements in or relating to the underground storage of water and has particular reference to the provision of a construction of underground reservoirs for trapping and storing rain-water.

BACKGROUND OF THE INVENTION

Field of invention and prior art

The rock or soil of which many islands and coastal areas of the world are formed is porous, permitting the sea to penetrate laterally for considerable distances from the shore to form a saline ground-water table, the level of which, where the porosity is sufficient, will rise and fall in conformity with the tidal movements of the neighbouring sea. Rainfall in such regions, instead of draining on the surface to form brooks and rivers, as in areas of less porous soil formations, penetrates the surface, at least in part, and follows the path of least resistance downwards through the soil until it reaches the saline ground-water table. In following the path of least resistance, the rain-water may migrate laterally underground considerable distances before reaching the saline ground-water table and in directions quite unrelated to the surface topography which could cause surface drainage to move in quite different directions. As the rain-water has a much lower density than the saline ground-water, it does not penetrate or mix with the ground water, unless disturbed but tends to spread out laterally as a thin sheet over the saline ground water again following the path of least resistance.

In the same way, sewage effluent from septic tanks, cess-pits, sewage lagoons and other sewage drainage areas, having a lower density than the saline ground water, will migrate below ground in the same manner as rain-water, and because the rain-water and sewage effluent have a similar density they will mix at any underground point of contact.

Where the ground is of high porosity and offers little resistance to the underground lateral movements of rain-water or sewage effluent, both will tend to form thin sheets flowing over the surface of the saline ground water, but when the porosity is such that there is some frictional resistance to underground lateral movements, each will tend to form plano-convex underground deposits floating on the surface of the saline water-table. The thickness of such deposits is largely a function of the above-mentioned frictional resistance.

Layers of rain-water formed in this way are frequently used as sources of domestic water supply by the simple expedient of drilling holes from the surface into the ground down to the water level and abstracting the water by pumping. However, this procedure is unreliable as any overpumping will cause intrusion of neighbouring saline water or sewage effluent thus polluting the fresh water supply.

Where the saline ground water is subject to the rise and fall conforming to tidal movement, some mixing occurs at the boundary line between the rain-water and the underlying saline water forming an intermediate layer of brackish water at the lower levels of the rain-water layer.

In many areas where suitable rain-water layers cannot form because of high underground porosity or the proximity of the sea, it is common practice to build rain-water catchments formed by paving a sloping area, such as a hillside, with surrounding walls to contain and lead the drainage of rain-water to a collecting basin or pipe at the lowest point from where it can be removed to storage reservoirs. Such catchments are costly, especially where the natural topography does not lend itself to the required drainage slopes, they are expensive to maintain and operate and are inefficient due to losses caused by evaporation and absorption into the paving material. Where rainfall, irregular throughout the year, falls, they require large reservoir capacity in relation to recovery to minimize losses from overflowing when reservoirs are filled to capacity. In flat areas, such as small coral islands, it is virtually impossible to build such catchments because of the inability to provide the necessary drainage slopes.

Summary of the invention

It is an object of this invention to provide an inexpensive construction of reservoir which will make it possible to collect and store rain-water underground in a manner which prevents lateral escape or contamination by contiguous saline or polluted waters and to provide a greater recovery than is obtained by pumping from naturally underground fresh water layers, and at far lower capital and operating costs than for surface catchments and reservoir installations.

According to the present invention therefore, there is provided a method of constructing a sub-surface water reservoir which comprises building a continuous wall beneath the surface of an area of porous ground to enclose a sub-surface volume of said ground, said wall being formed by building a substantially vertical water-impervious water-barrier to extend from substantially below the normal or natural level of the ground-water table to substantially above the expected upper level of the water table of water other than subterranean origin, whereby the lateral flow of water of other than subterranean origin is substantially prevented both into and out of said sub-surface volume of ground, sinking a water conduit (which is preferably a pipe-line) within the enclosed ground to extend down to a level above the saline ground-water table but within the body of trapped water of other than subterranean origin which penetrates through the porous ground into said sub-surface volume and providing a pump in association with said water conduit to raise trapped rain-water from the water reservoir to above the surface of the ground.

*Brief description of the drawings*

The invention will now be illustrated by way of a description of the accompanying diagrammatic drawings in which:

FIGURE 1 is a diagrammatic cross-section of an island with a housing development thereon, and FIGURE 2 is a plan view of the island of FIGURE 1.

*Description of a preferred embodiment*

In FIGURE 1 the island is generally represented by the reference 1 and the continuous water-barrier hereinbefore referred to is designated by the reference 2.

The sea 3 surrounds the island and the saline water-table which constitutes the ground water is generally shown in that portion of the porous soil of the island as constituting the volume of ground indicated at 4 in the soil outside the water-barrier 2. Entrapped within the water-barrier 2 are shown the saline ground-water table 5 with the layer of fresh water 6 resulting from the drainage of rain-water and other water of other than sub-surface origin through the porous soil of the island. It will be realized that because the layer of water 6 builds up within the portion of the island surrounded by the water-barrier 2 the weight of the such water lowers the level of the saline ground water somewhat in the manner illustrated in FIGURE 1.

Water can be drawn off by conventional means, such as a pipe 7, from the layer of water 6 entrapped in the soil. When the water is drawn up through a pipe 7, it is done by means of a pump 8 which pumps the water through pipes 9 to the storage water systems in the houses 10 which are diagrammatically represented.

In order to avoid any pollution of the water in the layer 6 the sewage outflow from the houses 10 is taken through the pipes 11 to a common pipe 12 which carries the sewage effluent away to a septic tank 13 which is located outside the water-barrier 2 so that the effluent escaping from the septic tank 13 cannot percolate back through the soil into the layer of water 6 but instead flows as a sheet over the surface of the saline water 4 lying outside the water-barrier 2 to seep into the sea 3.

The plan view of the housing development seen in FIGURE 2 illustrates how a plurality of houses can be supplied with water through the pipe 7, pump 8 and pipes 9 and also how the sewage effluent from the several houses can be taken to a common septic tank disposed outside the continuous water-barrier 2.

A feature of the invention consists in that said continuous wall is formed in part by water-impervious strata disposed beneath the surface of the ground connected to the remainder of said water-impervious barrier. Preferably the said wall extends above the level of the surface of the ground to constitute a barrier to the passage of surface water across from one side to the other of the line of the wall.

It will be further appreciated that the invention also provides, as an article of manufacture, a sub-surface water reservoir comprising a water-impervious, substantially vertical, continuous wall extending from at least the surface of the ground downwardly through porous ground to a level below the normal upper level of the ground-water table, a water conduit extending downwardly through the ground to terminate above the normal upper level of the ground-water table and a pump connected to the water conduit to raise trapped water above the surface of the ground.

It will be seen that the present invention is particularly advantageous for use in relatively flat areas where the surface of the ground is within a few feet of the saline ground-water table in a strip, which may be either wide or narrow, surrounding an area which may contain hills or higher land. A typical example of the latter would be a small, either hilly or relatively flat island where an enclosing peripheral boundary could be established around the shore at a predetermined constant level above the high water line.

After establishing the enclosing boundary line containing an area in which it is desired to collect and store rain-water for domestic or irrigation use, or boundary lines to control the underground drainage and disposal of sewage effluent, an impervious wall, membrane or water-barrier (hereinafter called water-barrier) is constructed along such boundary lines extending, preferably from some height above the ground (the height above ground being to prevent surface drainage over the top of such water-barrier from one side to the other), downward to a point corresponding to the lowest possible level of the saline ground-water table, or deeper if it is desired to store a greater depth of fresh water, plus some additional depth as a factor of safety.

Because the enclosing water-barrier is impervious, rain falling within the enclosed area cannot escape laterally and can only move downwards within the enclosed area until it reaches the saline ground-water table, and because it is of lesser density than the underlying saline ground-water table, it will spread out over the saline water within the enclosed area and, as the confined rain-water increases in depth, its weight will displace the underlying saline water downward to escape under the enclosing barrier; escape of the rain-water from within the reservoir is prevented or minimized by ensuring that the continuous wall constituting the water-barrier is carried down to a sufficient depth in the soil to avoid the rain-water reaching the level of the bottom of the wall.

The described underground water-barrier may be formed by any suitable conventional means such as trenching and filling the trench with concrete, or reconstituting the trenched material by adding cement or an asphalt binder and replacing it in the trench; or by underground line grouting with cement, asphalt or certain chemicals which will react with the underground rock to form a gel such as occurs in sandstone, or by trenching and placing a continuous layer of plastic sheeting against one vertical face of the trench and back-filling the trench or by affixing such plastic sheeting with some bonding material to the outside vertical face of the trench and leaving the trench open from which to pump the stored rain-water, or by the use of interlocked steel or concrete sheet piling, or by cutting a narrow trench by mechanical saw or flame cutting and inserting therein a metallic or plastic impervious diaphragm.

A small water leakage through the water-barrier will not seriously affect the efficiency of this method of storing rain-water, but where the water-barrier separates potable water from contaminated water it must be sufficiently water-impervious to prevent inward leakage from any water lying outside the water-barrier.

The man-made water-barrier need not be continuous through any areas of natural rock or soil which are themselves sufficiently impervious to form part of the water-barrier.

The invention, as described, has other advantages over other methods commonly in use for collecting and storing rain-water. The passage of the rain-water through the rock will often provide some filtration of suspended matter and insects. Water which is stored underground in the sub-surface reservoirs provided by the present invention will be cooler than water stored in surface reservoirs exposed to the sun. No algae, or insect larva should develop in this type of underground storage because the water is not exposed to sunlight.

Some examples of the present invention will serve to illustrate its many advantages.

In many islands and coastal areas of porous limestone formation the annual rainfall is 40–60 inches. Because of surface run-off and evaporation, transpiration and particularly the drainage to the coast, in the form of a thin fresh sheet of water flowing over the surface of the heavier saline ground-water, the amount of such rainfall which can be recovered from the formation of underground fresh water layers is small, varying from 0% on small islands where all the rainfall is lost by drainage to the sea to a maximum of 40% in areas far removed from the coast when the rainfall may be partly confined by less permeable formations acting as natural water-barriers.

By preventing lateral underground escape of rain-water by constructing underground water-barriers, the largest source of loss is eliminated and it is reasonable to assume that possibly some 60% of the rainfall can be collected and stored underground.

Assume an annual rainfall of 40 inches and a recovery factor of 60%, 12½ gallons of rain-water can be collected and stored for each square foot of enclosed surface area which is equivalent to 525,000 gallons per acre per year or 1450 gallons per acre per day, assuming complete uniform distribution of rainfall.

At such rates of production and storage it becomes possible to supply the needs of domestic water and sewage disposal of suburban residential districts subdivided into housing lots as small as 60 feet by 100 feet from within the confines of each lot.

Such rates of production and storage would also economically provide sufficient water for irrigation for most agricultural and vegetable crops during periods of drought or in areas where the normally-available ground water is saline and would thus permit a flourishing agricultural economy in many areas where it is presently impossible because of the irregularity of monthly rainfall.

It will be appreciated that where the disposal of sewage is effected by means of septic tanks or the like, care must be taken that effluent from such sewage treatment means is led away to be discharged into the ground at a point which is outside any continuous water-barrier enclosing a rain-water storage reservoir and is also preferably located at a level which is below the upper level of the water-barrier if it does not extend above ground level. Provided this precaution is observed, the sewage effluent will percolate down to the ground-water table and will flow away over the surface thereof.

I claim:

1. A method of constructing a sub-surface water reservoir in an area of porous ground beneath which is a saline ground-water table and in which water of other than subterranean origin will drain into the ground in sufficient quantity, which method comprises providing a sub-surface volume of said ground which is surrounded by a substantially vertical, substantially water impervious barrier which extends beneath the surface of said porous ground to surround a sub-surface volume of said ground, the lower edge of said barrier extending substantially below the normal lowest level of the saline ground-water table and the upper edge of said barrier being positioned at a level which is above the highest expected level of the water of other than subterranean origin which drains down through the surrounded volume of porous ground within said barrier, whereby the lateral flow of entrapped water out of said sub-surface volume of ground can be substantially prevented, and providing means within the surrounded volume of ground and extending down to a level above the saline ground-water table and within the body of trapped water for removing trapped water from the water reservoir.

2. A method as claimed in claim 1 in which the step of providing the sub-surface volume of ground surrounded by the barrier comprises building a continuous barrier member forming a part of said barrier and directing said barrier member to join water-impervious strata disposed beneath the surface of said ground, said water-impervious strata forming the remainder of said barrier.

3. A method as claimed in claim 1 in which said barrier extends above the level of the surface of the ground to prevent passage of surface water from one side to the other side of the barrier along the line of the barrier.

4. A method of constructing a sub-surface water reservoir in an area of porous ground beneath which is a saline ground-water table and in which water of other than subterranean origin will drain into the ground in sufficient quantity, which method comprises providing a sub-surface volume of said ground which is surrounded by a substantially vertical, substantially water impervious barrier which extends beneath the surface of said porous ground to surround a sub-surface volume of said ground, the lower edge of said barrier extending substantially below the normal lowest level of the saline ground-water table and the upper edge of said barrier being positioned at a level which is above the highest expected level of the water of other than subterranean origin which drains down through the surrounded volume of porous ground within said barrier, whereby the lateral flow of entrapped water out of said sub-surface volume of ground can be substantially prevented.

5. A method as claimed in claim 4 in which the step of providing the sub-surface volume of ground surrounded by the barrier comprises building a continuous barrier member forming a part of said barrier and directing said barrier member to joint water-impervious strata disposed beneath the surface of said ground, said water-impervious strata forming the remainder of said barrier.

6. A sub-surface water reservoir, comprising a substantially water impervious, substantially vertical barrier extending beneath the surface of an area of porous ground beneath which is a saline ground-water table and in which water of other than subterranean origin will drain into the ground in sufficient quantity, said barrier surrounding an area of said porous ground and a sub-surface volume of said ground, the lower edge of said barrier extending substantially below the normal lowest level of the saline ground-water table and the upper edge of said barrier being positioned at a level which is above the highest expected level of the water of other than subterranean origin which drains down through the surrounded volume of porous ground within said barrier, whereby the lateral flow of entrapped water out of said sub-surface volume of ground can be substantially prevented, and means within the surrounded volume of ground and extending down to a level above the saline ground-water table and within the body of trapped water for removing trapped water from the water reservoir.

7. A water reservoir as claimed in claim 6 in which said means for removing the trapped water comprises a pipe extending into the trapped water.

8. A water reservoir as claimed in claim 6 in which said means for removing the trapped water comprises a trench cut into the ground and having the bottom thereof below the level of the upper surface of the trapped water.

9. A sub-surface water reservoir, comprising a substantially water impervious, substantially vertical barrier extending beneath the surface of an area of porous ground beneath which is a saline ground-water table and in which water of other than subterranean origin will drain into the ground in sufficient quantity, said barrier surrounding an area of said porous ground and a sub-surface volume of said ground, the lower edge of said barrier extending substantially below the normal lowest level of the saline ground-water table and the upper edge of said barrier being positioned at a level which is above the highest expected level of the water of other than subterranean origin which drains down through the surrounded volume of porous ground within said barrier, whereby the lateral flow of entrapped water out of said sub-surface volume of ground can be substantially prevented.

10. A water reservoir as claimed in claim 9 in which said barrier comprises a barrier member portion, said barrier member portion joining a water-imprevious strata disposed beneath the surface of said ground, said water-impervious strata forming the remainder of said barrier.

References Cited

UNITED STATES PATENTS

| 623,782 | 4/1899 | Hammett | 210—170 |
| 1,125,848 | 1/1915 | Hunter | 61—1 |
| 1,805,993 | 5/1931 | Miller | 61—11 |
| 3,199,592 | 8/1965 | Jacob | 166—42 |

FOREIGN PATENTS 211,400  6/1909  Germany.

EARL J. WITMER, *Primary Examiner.*